US 7,092,968 B1

(12) United States Patent
Ebel et al.

(10) Patent No.: US 7,092,968 B1
(45) Date of Patent: Aug. 15, 2006

(54) SYSTEM AND METHOD FOR PLANNING AND IMPLEMENTING A DATA WAREHOUSE SOLUTION

(75) Inventors: Douglas H. Ebel, Loveland, OH (US); Ojustwin A. Naik, Dayton, OH (US); Richard L. Fowler, Marietta, GA (US); Daniel Patriarca, Astoria, NY (US)

(73) Assignee: NCR Corporation, Dayton, OH (US)

( * ) Notice: Subject to any disclaimer, the term of this patent is extended or adjusted under 35 U.S.C. 154(b) by 592 days.

(21) Appl. No.: 10/313,562

(22) Filed: Dec. 6, 2002

(51) Int. Cl.
*G06F 17/00* (2006.01)
*G06F 7/00* (2006.01)

(52) U.S. Cl. ............... 707/104.1; 707/102; 707/103 R

(58) Field of Classification Search ................ 707/1–3, 707/9, 10, 100–102, 103 R, 201, 104.1, 203, 707/103 Y, 103 Z
See application file for complete search history.

(56) References Cited

U.S. PATENT DOCUMENTS

| | | | | |
|---|---|---|---|---|
| 5,918,232 A | * | 6/1999 | Pouschine et al. ...... | 707/103 R |
| 5,930,798 A | * | 7/1999 | Lawler et al. ............... | 707/102 |
| 6,108,669 A | * | 8/2000 | Dalenberg et al. .......... | 707/203 |
| 6,167,405 A | * | 12/2000 | Rosensteel et al. ......... | 707/102 |
| 6,282,544 B1 | * | 8/2001 | Tse et al. ..................... | 707/101 |
| 6,397,202 B1 | * | 5/2002 | Higgins et al. ............... | 706/47 |
| 6,490,590 B1 | * | 12/2002 | Fink ........................... | 707/100 |
| 6,915,313 B1 | * | 7/2005 | Yao ............................. | 707/203 |

\* cited by examiner

*Primary Examiner*—Greta Robinson
*Assistant Examiner*—Jacques Veillard
(74) *Attorney, Agent, or Firm*—James M. Stover

(57) ABSTRACT

A system and method for planning, developing and implementing data warehouse solutions. A methodology including a plurality of tasks associated with the design and implementation of a data warehouse solution is represented by a visual model that identifies relationships between the tasks, and includes links between the tasks and content contained within a methodology database. The visual model is displayed within a visual modeling program, and can be customized for a particular data warehouse engagement through the selection of tasks displayed in the visual model for inclusion in the particular data warehouse engagement. Additionally, a customized methodology plan, statement of work, and project methodology guide for a particular data warehouse engagement can be automatically generated from content extracted from the visual model and methodology database.

12 Claims, 11 Drawing Sheets

SYSTEM AND METHOD FOR PLANNING AND IMPLEMENTING A DATA WAREHOUSE SOLUTION

CROSS REFERENCE TO RELATED APPLICATIONS

This application is related to the following co-pending patent application:

Provisional Application Ser. No. 60/431,571, entitled "METHODOLOGY FOR PLANNING AND IMPLEMENTING A DATA WAREHOUSE SOLUTION," by Douglas H. Ebel, Nicholas D. Johantgen, Richard Fowler and Daniel Patriarcia; filed on the same day herewith; which application is incorporated by reference herein.

FIELD OF THE INVENTION

The present invention relates generally to data warehouse solutions, and more particularly, to practices and techniques to be used in the planning and development of high performance, reliable data warehouse solutions.

BACKGROUND OF THE INVENTION

Teradata, a division of NCR Corporation, provides powerful data warehouse solutions for the retail, manufacturing, communications, travel, financial and insurance industries. These solutions combine Teradata's high-performance parallel database technology, a full suite of data access and management tools, robust data mining capabilities, world-class scalable hardware, and the most experienced data warehousing consultants.

Teradata has developed and documented the best practices and techniques to be used in the planning and development of high performance, reliable data warehouse solutions. These practices and techniques are collected together and organized into a methodology referred to as Teradata Solutions Methodology or TSM.

TSM is a system development methodology that describes, among other things, the methods, processes, tools, techniques, work products, skill sets, job assignments and project management requirements for data warehouse projects, and defines a framework for strategic and tactical data warehouse planning, design, implementation, maintenance and support. TSM is designed to allow multiple consulting, vendor and customer organizations to cooperate on a single project by sharing work activities, as well as to support world-wide deployment by the ability to define text in different languages. Project planning and time capture are integral parts of TSM with work assignments and tracking handled through a web interfaces. The methodology itself is stored in a relational database, thus facilitating the development, maintenance and use of TSM.

Methodology is essentially about communication—accurate, clear, precise and complete communication between the many individuals who will participate in the design and implementation of a data warehouse solution. The Teradata Solution Methodology outlines a sequence of procedures dictated by the needed inputs required to produce the next set of deliverables. It fosters clear project management based on an engineering approach. The result of methodology should be improved margins. The improvement in communications fosters growth, which depends on fast acclimation of new associates and coordination with business partners.

Historically, the Teradata Methodology has had low usage of formally developed, standard templates and processes. However, as Teradata continues to expand its professional services organization, array of solutions, and customer base, an efficient and consistent manner for preparing professional services employees and developing data warehouse solutions is desired. To this end, Teradata has developed TSM tools that assist a project manager in explicitly following the methodology by providing:

Estimating tools to rightsize the methodology steps to reduce risk of schedule overruns, Customization tools of the standard methodology to create a methodology plan for the specific solution and customer expectations, Generation of Standard Statements of Work based on customization of the Teradata Solution Methodology, Creation of a custom web site for an engagement to manage completed and revised work product, Creation of a standard Work Breakdown Structure (WBS) to allow analysis of project variance, tracking of associate experience levels, and linking of work product back to the specific steps in the methodology that created it, and Mechanized collection of completed work product for archival storage to facilitate the next engagement of Teradata Professional Services at the customer site, analysis of the usage of tools for improvement opportunities, and identification of examples of best practices to assist associates in executing similar engagements in the future.

Traditional system development methodologies provide very few tools, if any to help the project planner determine the impact of these decisions and, once the decisions are made, to create the project plan and track execution against that plan.

SUMMARY OF THE INVENTION

It is an object of the present invention to provide an improved system and method for planning, developing and implementing data warehouse solutions.

It is a further object of the present invention to provide a new and useful tool for aiding project managers in planning, developing and implementing data warehouse solutions.

It is a still further object of the present invention to provide a customizable methodology plan for the planning, development and implementation of data warehouse solutions.

The foregoing objects are accomplished through a system and method for planning, developing and implementing a data warehouse solution, the method comprising the steps of: (1) defining a methodology including a plurality of tasks associated with the design and implementation of a data warehouse solution; (2) establishing a methodology database containing content associated with each task; (3) creating a visual model of the methodology for display and customization within a visual modeling program, the visual model identifying relationships between the tasks, and including links between the tasks and content contained within the methodology database related to the tasks; and (4) customizing the methodology for a particular data warehouse engagement through the selection of tasks displayed in the visual model for inclusion in the particular data warehouse engagement.

The described embodiment automates the process for generating a customized methodology plan, statement of work, and project methodology guide for a particular data warehouse engagement from content extracted from the methodology database.

The content included within, or referenced within, the methodology database includes examples of best practices from prior data warehouse engagements; phase, service and task definitions; and collateral such as templates, guides, or examples for use during the execution of specific tasks. The methodology database contains all data, or references to data, necessary for creation of a complete Microsoft Project file, all data necessary for interfacing with time tracking systems for a project in execution, and data that will allow the automatic creation of certain textual and work estimation portions of engagement contracts, such as statements of work (SOWs).

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the Figures of the accompanying drawings, wherein elements having the same reference numeral designations represent like elements throughout and wherein.

BEST MODE FOR CARRYING OUT THE INVENTION

The Teradata Solutions Methodology specifies the ideal sequence and procedures for executing a customer engagement, i.e., a data warehouse solution order from a customer that may be executed as a series of projects. The methodology includes hundreds of tasks organized into phases and services, carefully sequenced to prevent re-work and reduce risk. Phases, services and tasks are defined as follows:

A phase is a group of TSM-defined services.

A service is a collection of TSM tasks that have defined inputs and work products.

A task is an ordered collection of steps that produce deliverables and/or work products. A task may include a series of steps that describe the actions needed to complete the task. Each step does not necessarily produce an asset.

Figure 1A:
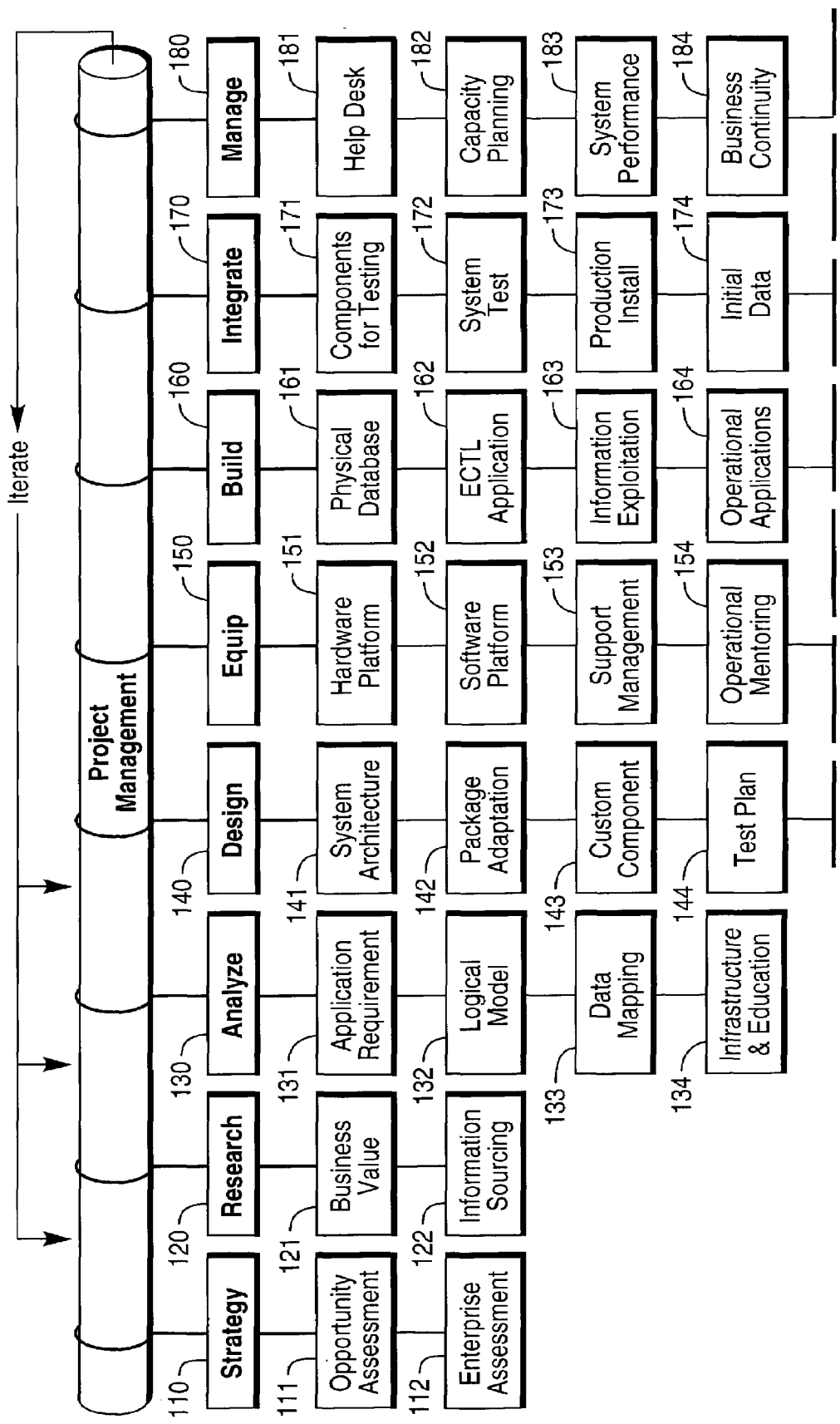
FIG. 1 provides a block diagram illustration of the phases and services included within the Teradata Solutions Methodology.
Figure 1B:
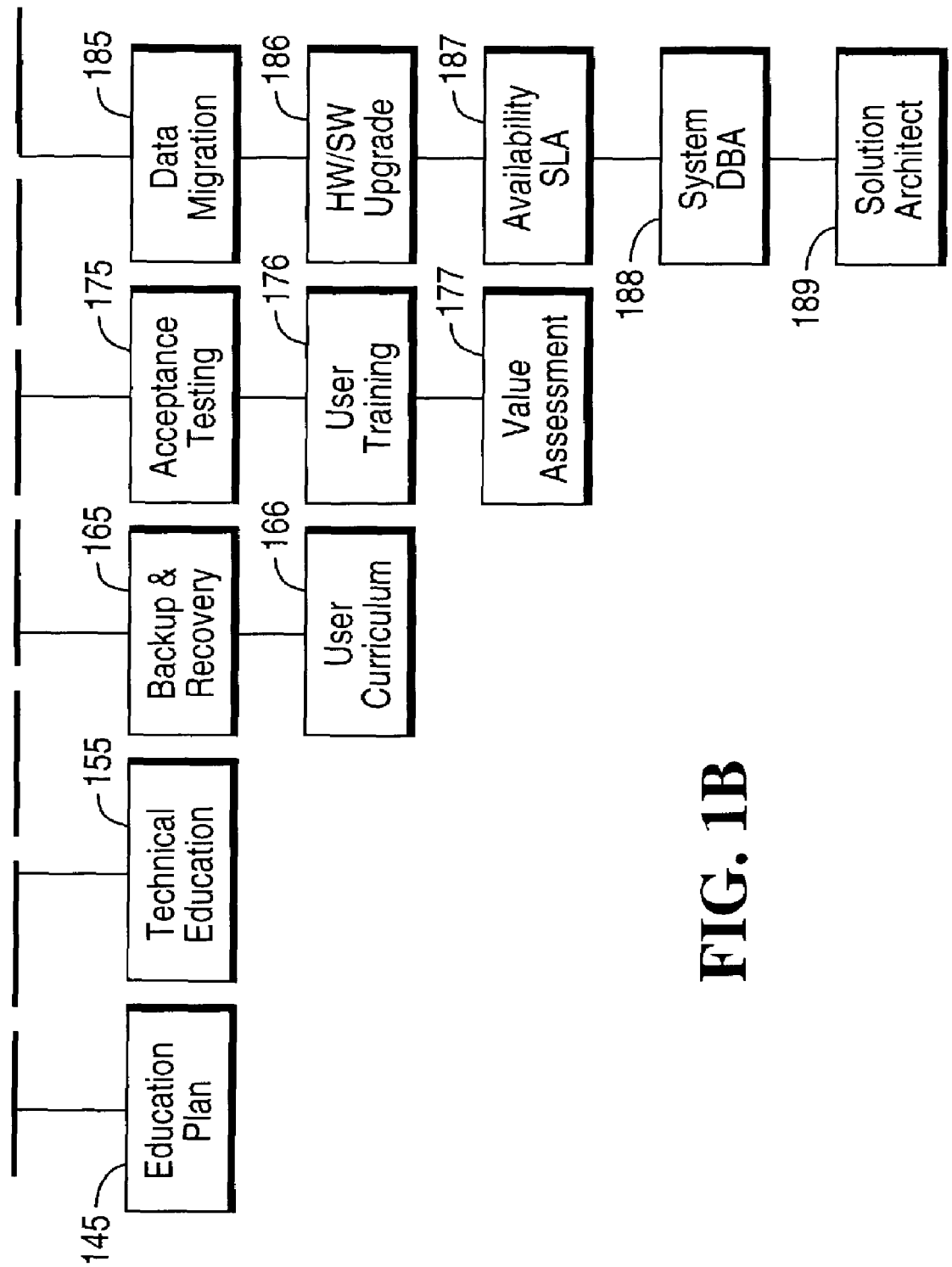

An identification of the TSM phases and services, and the sequencing of those elements are illustrated in FIG. 1. The structure of the methodology is graphically represented by a diagram that depicts each of the eight phases of the methodology as columns, with services shown as boxes within those columns. Each service contains virtually everything needed to plan for and deliver the service, e.g., tasks, estimates, job roles, tools, inputs, deliverables, etc.

TSM services, described below, are assigned names that include the name of their phase followed by two words that describe the services. Abbreviated names, comprising the first letters of the three words included in the service names, are also provided to refer to the services.

Strategy Phase

The strategy phase 110 identifies services that clarify the scope of an engagement by examining the entire enterprise to identify the specific business units and/or business functions with the greatest ROI opportunities to leverage information and the least liabilities for initial development.

The Strategy: Opportunity Assessment (SOA) service 111 lasts about two weeks for most Clients to collect information from top management on objectives, drivers, issues, and needs and to document business challenges/opportunities, readiness for a data warehouse project, recommended business changes, recommended information changes, and the value of the recommended changes.

The Strategy: Enterprise Assessment (SEA) service 112 determines which organizations, applications, systems, information, and processes have the highest immediate data warehousing feasibility. This service focuses research activities to specific areas of the business and collects organization and process context information to ensure subsequent services lead to an enterprise solution for the data warehouse.

Research Phase

Within identified business areas, the research phase 120 includes services that identify and rank issues and opportunities based on the potential value, difficulty to execute, and abundance of information needed to support resolution of the issues and opportunities. These services are used to define a prioritized sequence for building the identified data subject areas and the lists of business questions supported at each release.

The Research: Business Value (RBV) service 121 identifies, for the selected business areas that are likely candidate users of the data warehouse, the business opportunities, information requirements, process changes, and the value of the process change. This provides prioritization and focuses development on the uses that will generate the largest benefit to the business.

The Research: Information Sourcing (RIS) service 122 performs a detailed examination of the candidate source systems for their potential to answer the business questions identified in Research: Business Value. The result is a refinement of the data warehouse priorities based on availability of information.

Analyze Phase

The analyze phase 130 includes services for identifying specific application requirements, the logical data model of the related business areas, and the available environment and infrastructure available to support identified subject areas. The analyze phase produces a list of specific application interfaces, data models, and content delivery to be supported for the current and subsequent releases surrounding the selected data subject areas.

The Analyze: Application Requirement (AAR) service 131 identifies the specific features of the applications that are needed to deliver value to the Client. These features include content, performance, availability, and form of output.

The Analyze: Logical Model (ALM) service 132 creates, modifies, or validates the logical model of the information supporting the business processes within the scope defined for this iteration of the data warehouse implementation. The resulting model will easily translate into physical data warehouse database(s) during the Build phase and will define the target of the loading and the source structure for all output activities.

The Analyze: Data Mapping (ADM) service 133 performs a detailed analysis and mapping of data from the source systems to the logical data model to determine the level of effort that will be required to design and build the transformation and to determine any gaps that may affect the scope of the application.

The Analyze: Infrastructure & Education (AIE) service 134 documents the environment in which the data warehouse will operate, including hardware (host computers, servers, workstations), network (LANs, WANs, FDDI), and processes (operational monitoring, development standards, support standards). This service also includes an assessment of the knowledge and skills of personnel that will be involved in building, supporting, and using the application. This can impact the selection of tools, design of the application, and/or specification of the training program.

Design Phase

The design phase 140 includes services for transforming requirements into a solution design based on off-the-shelf components (database, query tools, applications) and custom interfaces (data extraction from legacy and external data sources and feeds to other applications). The specifications range from the overall architectural design, to the installation and customization of off-the-shelf components, to custom program specifications, to testing components needed to verify data quality and integrity.

The Design: System Architecture (DSA) service 141 maps out the overall strategy of moving data from its source systems to the data warehouse and from the data warehouse to its destinations. When there is large data or critical active data warehouse performance criteria, a set of "thumbnail sketch" prototypes of application processes is executed to ensure that the infrastructure, data model, and data warehouse hardware are capable of meeting performance expectations.

The Design: Package Adaptation (DPA) service 142 determines the customization and installation plan for all packaged software, including NCR solutions and vendor tools. A service byproduct is a definition of all gaps that will need to be filled in with custom application development.

The Design: Custom Component (DCC) service 143 lays out the detailed specifications for inputs, outputs, and processing for coding of custom constructed components (load, exploit, operational). Resulting specifications can be handed off for coding by someone with minimal knowledge of the overall system.

The Design: Test Plan (DTP) service 144 identifies testing processes to be executed for the integrated system and for client acceptance tests. Some testing logic is integrated into the component design to make component testing more productive and yield a system that is resilient to subsequent changes in source systems.

The Design: Education Plan (DEP) service 145 designs the mixture of classroom training, CBT, manuals, online help, and help desk support needed to achieve optimum start up for the custom and packaged components that will be part of the application as based on the assessment of current skills and training offerings.

Equip Phase

The services identified within the equip phase 150 install and support the hardware and software needed for the building and operation of the data warehouse.

The Equip: Hardware Platform (EHP) service 151 provides pre-installation planning, site preparation, unpacking, cabling, and testing of the hardware components for the data warehouse. The result is a fully configured, tested, and accepted hardware platform. This service may also include additional services such as Customer Education training, Operational Mentoring, Backup/Archive/Restore, and Disaster Recovery.

The Equip: Software Platform (ESP) service 152 provides pre-installation planning, software loading, configuration, and testing for the platform operating system, Teradata database, and Teradata utilities as well as third-party software tools required for ECTL, operational management, and others. Additional services such as Customer Education training, Operational Mentoring, Backup/Archive/Restore, and Disaster Recovery may also be included.

The Equip: Support Management (ESM) service 153 provides basic support for the hardware and software, including maintenance upgrades, diagnosis, and repair of failing parts.

The Equip: Operational Mentoring (EOM) service 154 provides an on-site, hands-on education to Client operational personnel around Teradata warehouse best practices, proactive measures, issue resolution and problem avoidance. Subjects covered are tailored to each Client's needs. As a result, operational personnel effectively operate the data warehouse with minimum effort and maximum availability and performance. This service provides an opportunity to sell the benefits of additional services such as how to efficiently run a Teradata system (Customer Education training, System Performance, Backup/Archive/Restore, and Business Continuity).

The Equip: Technical Education (ETE) service 155 delivers technical education to the Client for all facets of the technical solution: hardware platform, software components, and Teradata. In addition, technical training is provided for all tools, including those supplied by third parties. Basically, any training required for to support the operational computing environment of the data warehouse solution is provided.

Build Phase

The build phase 160 includes services for transforming solution design into working applications. Services include and physical databases, providing software to extract, clean, transform, and load data, as well as reporting and analysis delivery to users. This also includes building the training to ensure rapid start-up and utilization of the new data warehouse.

The Build: Physical Database (BPD) service 161 converts the logical data model into physical databases, tables, indexes, and views. It also defines the environment(s) for component development, integration testing, and production usage.

The Build: ECTL Application (BEA) service 162 constructs the logic to extract, clean, transform, and load data to the data warehouse and includes all error-handling and content reconciliation to source systems. The result is a series of tested software components.

The Build: Information Exploitation (BIE) service 163 builds all output processes from the data warehouse, including new reports, customization of packaged reports, exports to other applications, and data mining processes.

The Build: Operational Applications (BOA) service 164 constructs applications that monitor application and overall platform health, usage accounting, violations of privacy and security, and performance against Service Level Agreements.

The Build: Backup & Recovery (BBR) service 165 address backup and recovery strategies which are critical to protect against large disasters such as loss of data center or small ones such as the incorrect update of a table or inadvertent drop of a table by system support personnel. The resulting procedures take into account the frequency of update, the routine impact to users of the backup activity, and the adverse impacts to organizations of data loss. BUC Build: User Curriculum This service constructs all necessary parts of the curriculum, including training materials. This involves a partnership with the target business organizations for testing data as it is being constructed and definition of new work processes and a set of starter reports for new users to learn in training. This will accelerate the usage and the return on investment.

Integrate Phase

The integrate phase 170 includes services that take tested components and assemble them into a system for testing, runs the tests, merges the tested system into production, performs initial data loads of current and historical data, and performs system acceptance testing. Finally, initial users are trained and an assessment is performed to verify that the intended business benefits can be achieved.

The Integrate: Components for Testing (ICT) service 171 takes all components from developers and suppliers and makes necessary changes to file specifications, logons, and database names to create a complete system for testing.

The Integrate: System Test (IST) service 172 runs test data through the complete system, executes validation scripts, engages users in ad hoc testing, and provides support to the system during testing.

The Integrate: Production Install (IPI) service 173 takes all the myriad components of the tested data warehouse (scripts, programs, queries, reports, utilities, etc) and migrates those components to "production" status. Data structures (tables, views, ROLAP/MOLAP cubes, etc.) are also built. The final, comprehensive plan must take care that the existing production system (if applicable) continues to deliver against Service Level Agreements during the transition. Control and review processes ensure that all components are properly moved to their appropriate target locations.

The Integrate: Initial Data (IID) service 174 performs the initial load of data to the system, including definitional data (generally small) and historical transaction data (generally large).

The Integrate: Acceptance Testing (IAT) service 175 performs all tests defined earlier in the engagement as requirements for formal acceptance of the data warehouse and all its components. The acceptance test plan is reviewed and implemented. Expected results documented in the plan are augmented with actual results. Any deviations from expected results are processed according to the acceptance plan, usually by changing one or more system components (query code, ECTL, etc) and re-running the test(s).

The Integrate: User Training (IUT) service 176 will deliver initial data warehouse training to users, including information on new work processes possible with new information, the logical model of the available information, and usage of the tools. The result should be a faster ROI due to a faster buildup of productive usage.

The Integrate: Value Assessment (IVA) service 177 projects ROI that would result from the process changes facilitated by the information provided in the data warehouse. This service validates that the users are achieving business benefits from the application and identifies follow-on requirements for information and training to increase the return on the data warehouse investment.

Manage Phase

Once the database system has been established, it will become more mission-critical as organizations evolve business processes based on new information. The manage phase 180 includes performance management and capacity planning services that help ensure that the system continues to deliver good performance. Disaster recovery services provide protection against major business impact. In addition, as necessary, services can be provided for upgrading the software, relocating the hardware, or migrating the data to a new platform and, the Client can outsource numerous support activities, such as database administrator and help desk.

The Manage: Help Desk (MHD) service 181 provides to data warehouse end users, who typically are not technically trained and/or only trained on a subset of the application software functions, the ability to call and get answers to "how to's", best practices, current and future usage about the software in terms they understand. In addition, a vendor/advocate is available to escalate users' concerns about the product's current and future features and to help get complex technical problems resolved.

The Manage: Capacity Planning (MCP) service 182 helps Clients plan for the expansion including the addition of applications, users, data volume, remote locations, and operations, among other factors. Any of these additions could affect the capacity and performance of the data warehouse environment. Proactive planning for changes will allow the user community to continue to work with limited or no disruption. With emphasis on knowledge transfer, the Client is shown how to use the tools and methods of capacity planning and how to interpret and use the information provided by the tools.

The Manage: System Performance (MSP) service 183 entails two major activities: system performance audit and system performance tuning. The system performance audit includes a review of the Client's Teradata system environment and parameter settings to determine ways to maximize efficiency, an in-depth traffic analysis to isolate workflow bottlenecks, and a load balancing analysis to identify ways to reduce response times. System performance tuning provides implementation of the recommendations resulting from the system performance audit. In addition, mentoring is provided throughout the engagement for two members of the client's IT staff.

The Manage: Business Continuity (MBC) services 184 provide recovery from virtually any type of disaster and provide on-going availability of mission-critical resources. Business Continuity may include use of Teradata Recovery Centers, which are shared access environments with Teradata equipment on standby for subscriber usage and work areas that enable continuity of essential processes until normal operations are restored. Key activities include Business Impact Analysis, development of a disaster recovery plan, and a Recovery center agreement for an alternate IT facility in the event of disaster.

The Manage: Data Migration (MDM) service 185 covers all aspects of migrating data from an existing Teradata platform to a new Teradata platform, without using interim tape storage. Key activities include system audit, identification of optimal data migration path, change control management, and migration.

The Manage: HW/SW Upgrade (MHU) service 186 covers all aspects of Teradata hardware, database and utilities software upgrade, including formal change control meetings, development of a comprehensive change control plan, verification of hardware, firmware and software release levels, and data conversion, as appropriate.

The Manage: Availability SLA (MAS) service 187 provides the on-going monitoring of system performance against metrics of system availability, data availability, and system performance. Causes of failure are evaluated and corrective actions are recommended.

In accordance with the Manage: System DBA (MSD) service 188, NCR personnel perform Teradata system and/or database administrative and maintenance tasks, including disk management, data administration, security management, data backup and recovery, and operating system tuning. For a majority of Clients, the service will be delivered through an onsite setup period and then move to a remotely managed solution.

The Manage: Solution Architect (MSA) service 189 provides a Teradata consultant to the Client, on a full- or part-time basis, to perform any of the following: mentoring, technical support, thought leadership and best practices in all areas of data warehousing.

TSM Tools

Each task included within the services identified above has one or more job roles assigned to it from professional services, Client Information Technology, or business subject matter experts and executives. Each task consumes one or more inputs to produce one or more outputs. The tasks are scheduled for execution based on the planned availability of all inputs. However, not all tasks will be required in every engagement. As an aid to project managers and professional services personnel, NCR has developed TSM tools simplifying the customization of the methodology for a given customer project and selected solution. The TSM tools not only enable project managers and professional services personnel to view the elements within the TSM methodology, but also enables them to create and modify the methodology plan for a specific project since some assets, tasks, or even services may not be needed for every project.

The methodology content is placed into a Teradata Database with a data model designed to relate services, tasks, assets, and job roles. The TSM database contains, or contains references to, examples of best practices from prior data warehouse engagements, as well as phase and services definitions, tasks and collateral. For projects that are not standard data warehouse engagements, there are Solution Modifier files that contain additional tasks, collateral, and other information that can be used to customize the TSM for other engagement types, such as e-Business, CRM, or Data Mart Consolidation.

Figure 2:
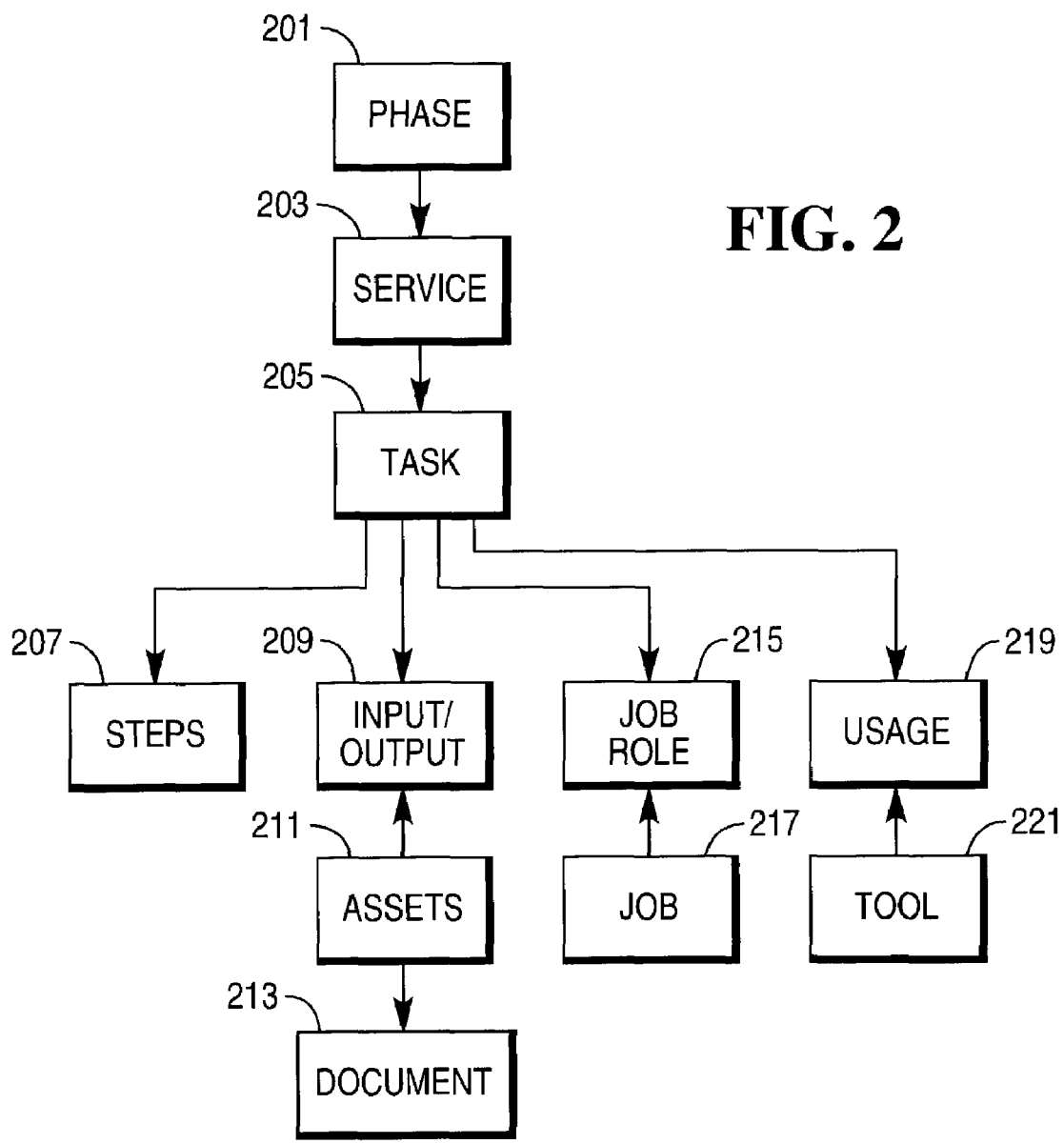
FIG. 2 provides a high-level data model for a database containing TSM methodology content.

FIG. 2 provides a high-level data model of the TSM database. All TSM objects, e.g., phases 201, services 203, tasks 205, assets 211, steps 207, job roles 215, documents 213, and associations between these objects are defined in the TSM database. Assets 211 are connected to the appropriate tasks as inputs or outputs 209. Standard SQL and GUI-based query and update facilities can be used to extract data from the database, as well as to ensure that the necessary associations are present after updates are applied.

Phases, services, tasks and steps have been defined above. An asset 211 is defined as any work product or deliverable of a data warehouse project, whether an input or output of any given task. A document 213, or collateral, is any templates, guide, or examples available through TSM for use during the execution of a specific task. There may be several pieces of collateral for a given asset, such as templates adapted for different solutions, several examples, and perhaps a guide. A job role 315 is a generic skill set used to describe the people needed on a project.

The TSM Database contains all data necessary for creation of a complete Microsoft Project file, all data necessary for interfacing with time tracking systems for a project in execution, and data that will allow the automatic creation of certain textual and work estimation portions of engagement contracts, i.e., statements of work (SOWs).

The TSM Database also includes language records associated with the major objects, e.g., phases 201, services 203, tasks 205, assets 211, steps 207, jobs 217 and tools 221, that enable the storage and maintenance of different language translations of the Teradata Service Methodology.

The set of tools associated with TSM provides the capability to browse the TSM database for information to assist in the planning and execution of a data warehouse project. It also allows the extraction of data to use in, among other things, the preparation of the engagement contract or statement of work (SOW), the project plan, preparation of visual models, in time tracking and project plan task completion, and in archiving work products from completed projects. Specific tools and their capabilities include:

(1) TSM Visual Model. A visual representation of the Teradata Solutions Methodology, displayed in a visual modeling system such as METIS Visual Modeling Platform by Computas AS. The TSM methodology may be customized within the visual modeling tool, after which the completed methodology plan is exported to comma-separated values (CSV) files for use by the TSM Browser.

(2) TSM Browser. The TSM Browser is used by project staff to refer to methodology technique, templates, examples, and guides from compact disk (CD) or Web sources, manage work in process, and submit the completed work product to project management. The TSM Browser is used by project management to interface to Microsoft (MS) Project, create sections of the Statement of Work (SOW), generate the engagement web site, receive completed work product, and at project closeout, send the project assets to the Archive.

(3) TSM Archive Manager. The TSM Archive Manager receives completed assets, builds metadata based on data from the TSM Browser and a time management and tracking facility, and updates the archive web site with metadata about the completed work product for the project, solution, customer, and industry. And (4) Archive Web Site. The Archive Web Site provides indexing of completed work product in the archive using the methodology high-level diagram and drop down boxes by Industry, Solution, Customer, and Project.

TSM Visual Model

Figure 3:
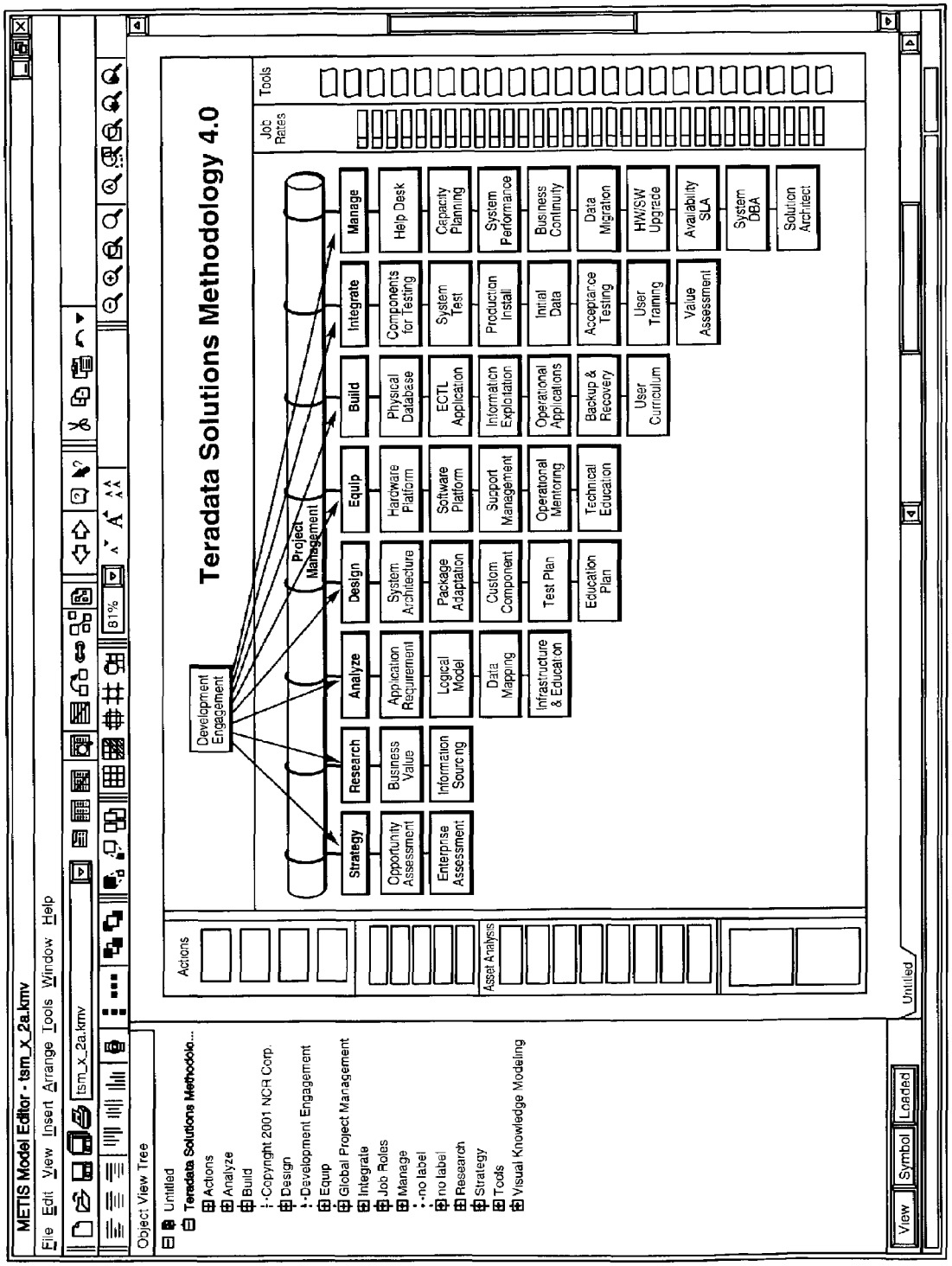
FIG. 3 provides a high-level view of the TSM Visual Model, displayed in a METIS Visual Modeling Platform.

A high-level view of the TSM Visual Model, as viewed with the METIS Visual Modeling Platform, showing the TSM phases and services is illustrated in FIG. 3. Each service may be enlarged to reveal included tasks and steps. Although not shown, each phase, and its included services, is represented in a different color. The TSM Visual Model, as illustrated in FIG. 3, corresponds to the methodology as shown in FIG. 1

The TSM Visual Model is a graphical representation of the TSM physical data model, a hierarchy of related tables that contain the TSM data/components. The TSM Visual Model in METIS format graphically depicts all relationships between the various elements within the methodology and allows the user to see at a glance how changes to one area of the methodology impact other areas. The model also makes those impacts visible through color-coded symbols. For example, if a service is not needed, the service can be turned off, and the resulting visual model shows any related components as gray boxes. The user can see the visual impact of removing a service to the other components.

Figure 4:
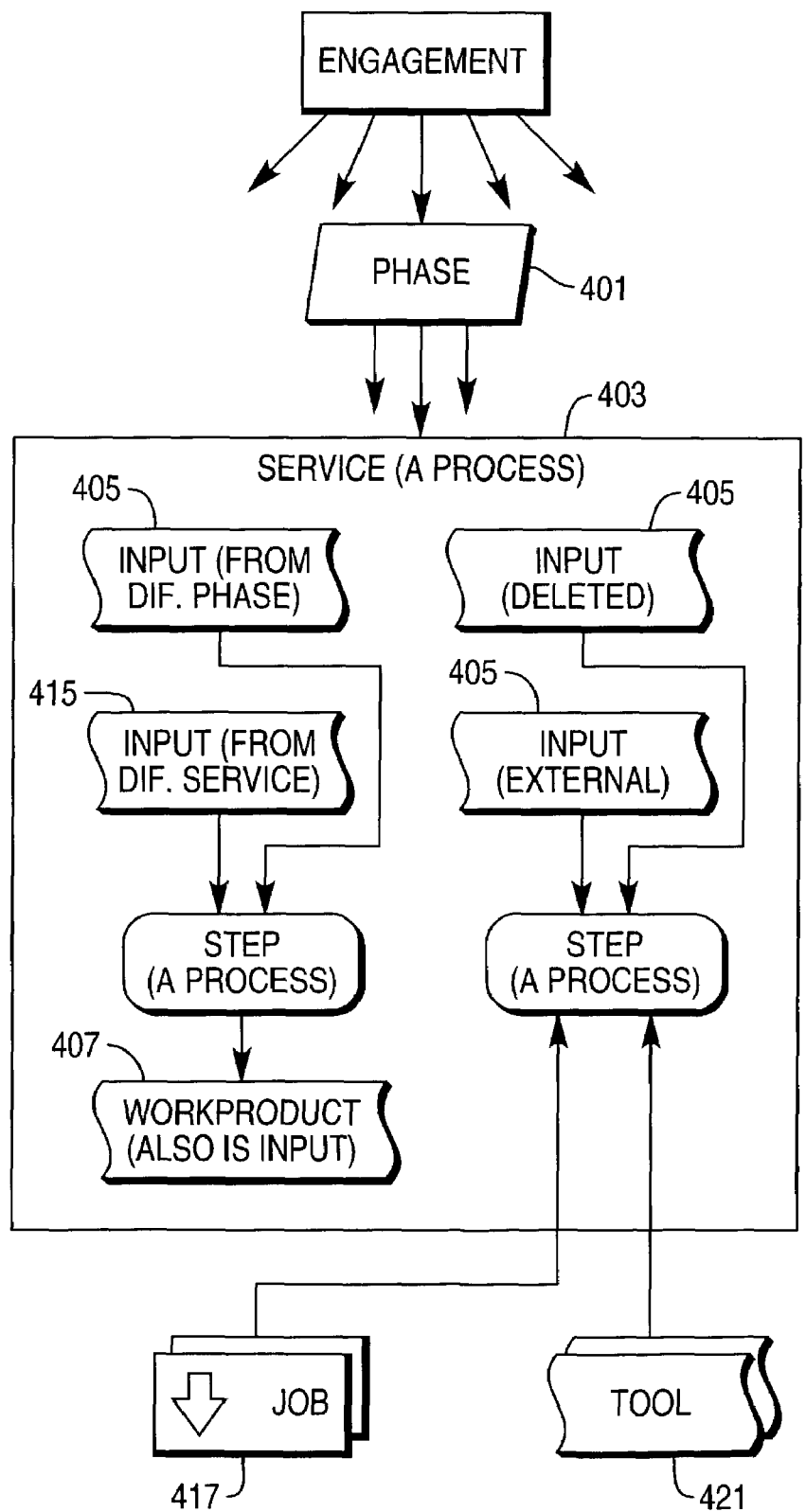
FIG. 4 provides an illustration of the objects used within the TSM Visual Model for representing phases, tasks, steps, and other elements.

FIG. 4 provides an illustration of the objects used within the TSM Visual Model for representing phases, tasks, steps, and other elements. The engagement object 423 is merely used to hold the overall description of the engagement along with the estimated days of the engagement. Those days are prorated by other objects to phases, services and steps. The phase object 401 is used to organize a set of services between major project milestones. Along with a text description, it sets the color that will be used by all services, steps, and assets attached to it. It also contains a "% of Parent" used to prorate the estimated days of the Engagement object to the phase.

The process or services object 403 is used to model services, steps, substeps, etc. Each process object is logically stored as a child of a phase object or other process objects. As a result, they inherit the color of their parent object, and may allocate a percentage of the parent's FTE days. The process object 403 has an engagement multiplier that may be set at 0, 1, or any other value to indicate whether the service, step, substep, etc is to be used in a current engagement. If the engagement multiplier is set to zero, the process and all of its assets are regarded as deleted. The engagement multiplier may be set to a value greater that 1 to allocate more days than the standard engagement. Although each service is a child of a phase object, they are positioned externally, in a vertical column beneath their phase. Steps are organized within the service in rows, left to right, top to bottom. If sub-steps are used, they are organized left to right, top to bottom within their step.

The asset objects 405 and 407 are used to represent required or optional inputs to a step and the resulting work product output from a step. Some work products are used as inputs to one or more subsequent steps. The relationship between a process and asset indicate whether for a given step, the asset is an input 405 or an output 407. When an asset is a work product, it is also made a child of its creating process. Accordingly, an asset inherits the color of the parent process it is created by, and will be "deleted" when its parent process engagement multiplier is set to zero. When the work product is used within the same service, an "Is Input For" relationship is drawn within the service container to the step where it is used. When used in a different service, a mirror view is pasted such that when the asset appears in a different phase, it will carry the color of its creating phase.

When a creating process is deleted, the color of created assets is changed from the color of its parent phase to gray. Colors used in the visual model are as follows:
NCR Provided: Color of the task, service, and phase, unless the engagement multiplier of one of those is set to zero, in which case the asset will be light gray;
NCR IP: White;
Customer Provided: Brown;
Partner Created: Aqua Green; and
Not Produced: Light Gray.

If there is not at least 1 work product of a task that is "NCR Provided", then the task will be forced to gray as well.

The job object 417 is used to represent people working on a project. The role that links them to a task allows a job role type to be defined along with a % of effort. The tool object 421 is used to identify specific software tools that will be required on an engagement.

Figure 5A:
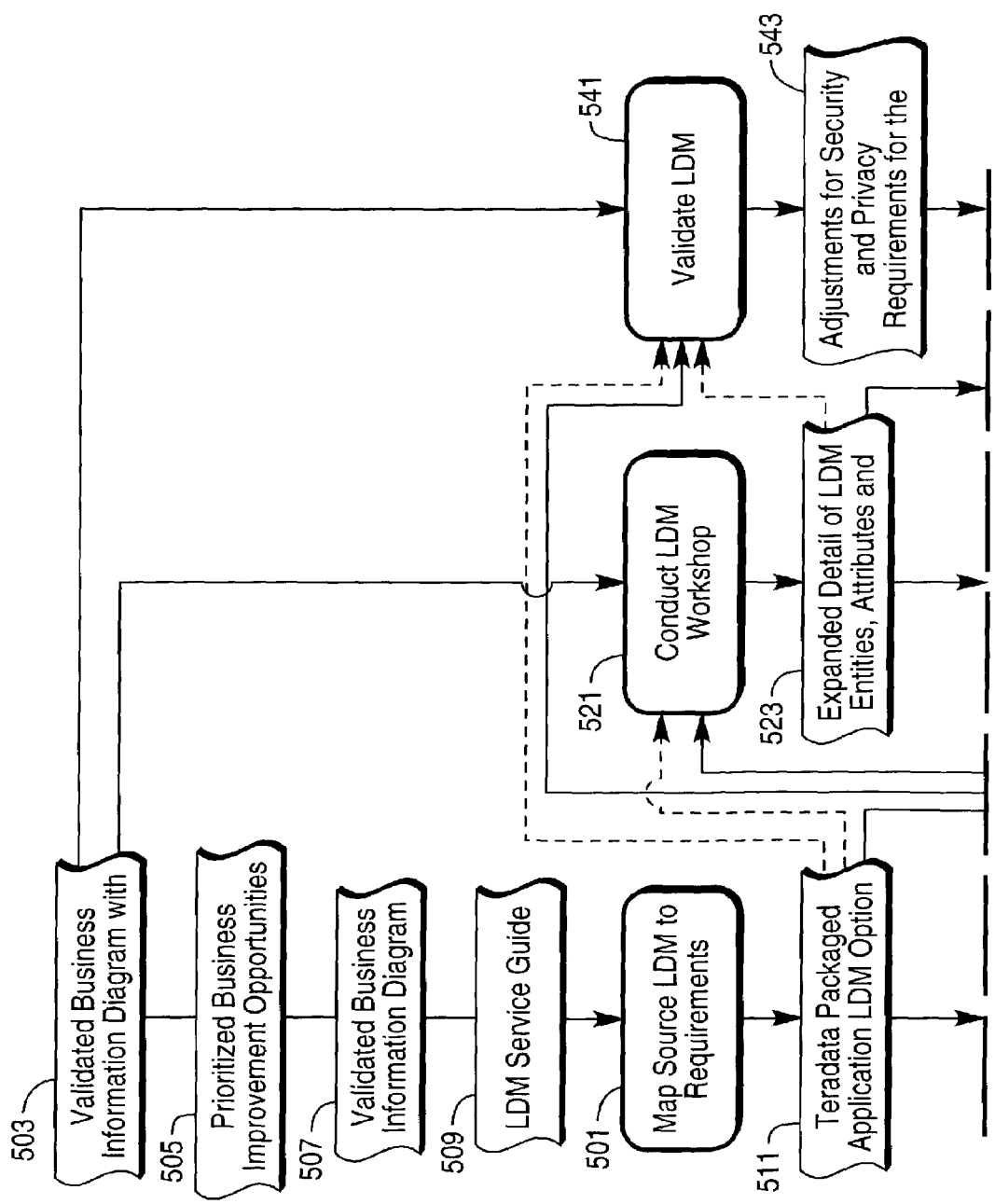
FIG. 5 provides an enlarged view of the Analyze: Logical Model service of FIG. 3, showing included tasks and assets.
Figure 5B:
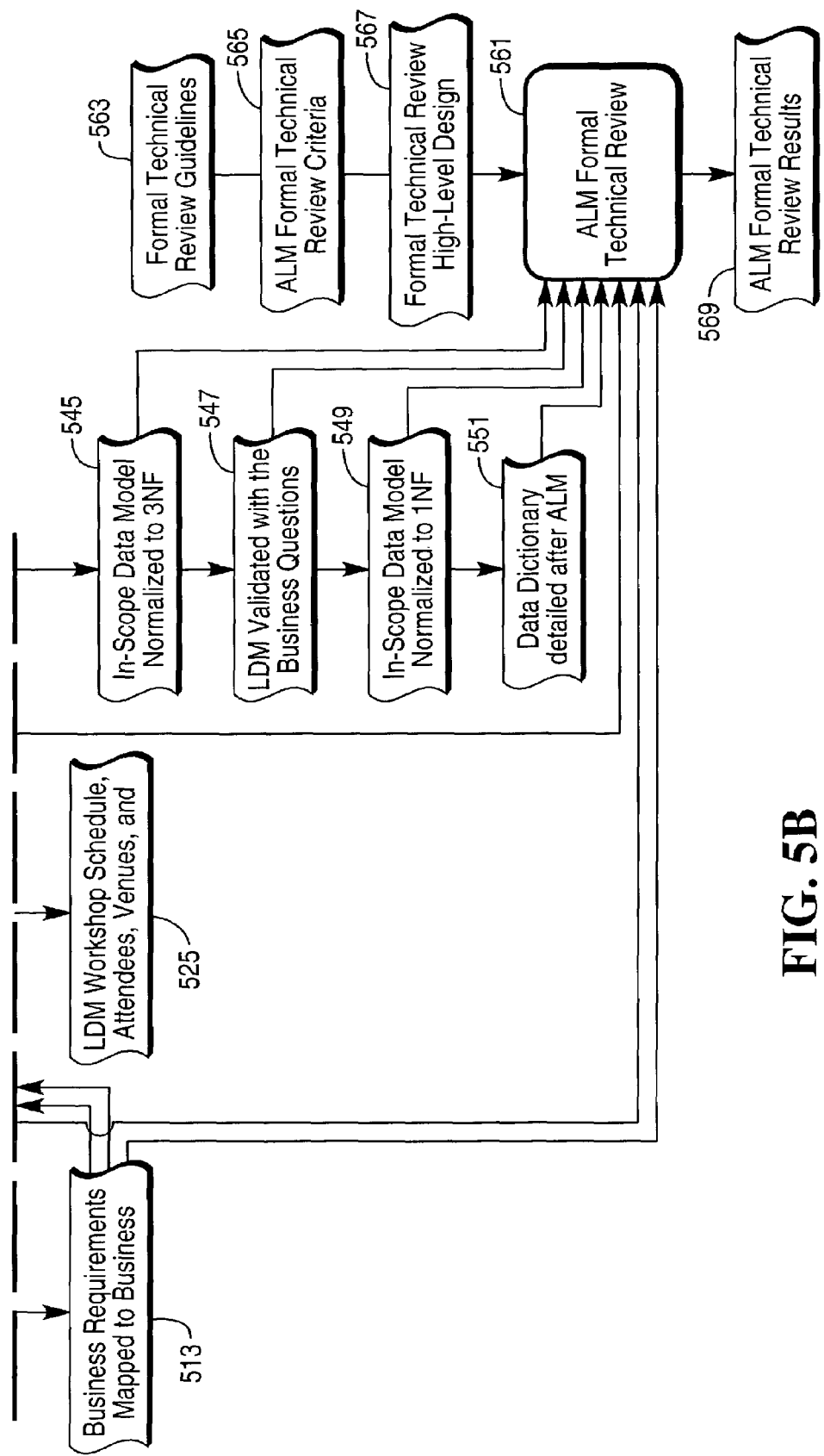

For illustrative purposes, the Analyze: Logical Model service 132 is shown in expanded view in FIG. 5. As shown, the Analyze: Logical Model service 132 includes four tasks: Map Source LDM to Requirements 501, Conduct LDM Workshop 521, Validate LDM 541, and ALM Formal Technical Review 561.

Analyze: Logical Model service 521 creates, modifies, or validates the logical data model of the information supporting the business processes within the scope defined for a data warehouse implementation. The Map Source LDM to Requirements task 501 guides the creation or selection of an appropriated data model and mapping of individual data elements from business questions to the data model.

Input assets to the Map Source LDM to Requirements task 501 include Validated Business Information Diagram with Source References asset 503, Prioritized Business Improvement Opportunities asset 505, Validated Business Information Diagram 507, and LDM Service Guide 509.

The Validated Business Information Diagram with Source References asset 503, an output asset from the Research: Information Sourcing service 122, is a validated business information diagram with added information regarding the sources for each data model attribute/column that is within scope of the current project. It is a combination of the prevailing data model with source system information that may be in the form of cross-referenced documents or included within an ERwin® database modeling file.

The Prioritized Business Improvement Opportunities asset 505 is a list of business questions prioritized by a consensus of attendees of a business value workshop. This asset is a work product generated from the Research: Business Value service 121.

The Validated Business Information Diagram asset 507, also an output from the Research: Business Value service 121, is a modification of the data model built in the Strategy phase or the previous iteration of an engagement. The modifications included are likely to be minor on the diagram, but more significant in the tuning of definitions behind the entities and attributes.

The LDM Service Guide asset 509 is used as a reference by the Analyze: Logical Model service.

Output assets or work product of the Map Source LDM to Requirements task 501 include Teradata Packaged Application LDM Option Evaluation asset 511 and Business Requirements Mapped to Business Information Diagram asset 513. The Teradata Packaged Application LDM Option Evaluation asset 511 asset is a report comparing all data elements previously captured in the logical data model as mapped to the data elements required for implementation of a packaged data warehousing option.

The Business Requirements Mapped to Business Information Diagram asset 513 lists a comparison of all data elements captured in the data modeling process as mapped to the data elements required for answering the business questions from the Research phase. The data elements listed are those attributes of the logical data model that are included in the scope of the current engagement cycle.

The Conduct LDM Workshop task 521 guides the development of the existing data model provided by the Strategy phase, from a Teradata solution package or from an existing customer model into a data model approaching First Normal Form (1NF).

Inputs to the Conduct LDM Workshop task 521 include Validated Business Information Diagram with Source References asset 503, Teradata Packaged Application LDM Option Evaluation asset 511 and Business Requirements Mapped to Business Information Diagram asset 513.

Output assets or work product of the Conduct LDM Workshop task 521 include the Expanded Detail of LDM Entities, Attributes, and Relationships asset 523 and the LDM Workshop Schedule, Attendees, Venue, and Logistics asset 525. The Expanded Detail of LDM Entities, Attributes, and Relationships asset 523 documents exactly which entities and attributes fall within the existing data model and clarifies and refines definitions for its attributes.

The LDM Workshop Schedule, Attendees, Venue, and Logistics asset 525 is list of those people who are to be scheduled for participation in a logical data modeling workshop.

The Validate LDM task 541 details the steps for refining the existing data model from the workshop task into a carefully crafted data model at 1NF, validating the data model with customer representatives, and after validation, engineering of the data model to Third Norma Form (3NF).

Inputs to the Validate LDM task 541 include Validated Business Information Diagram with Source References asset 503, Teradata Packaged Application LDM Option Evaluation asset 511, Business Requirements Mapped to Business Information Diagram asset 513, and Expanded Detail of LDM Entities, Attributes, and Relationships asset 523.

Output assets or work product of the Validate LDM task 541 include Adjustments for Security and Privacy Requirements for the Data Model asset 543, In-Scope Data Model Normalized to 3NF asset 545, LDM Validated with the Business Questions asset 547, In-Scope Data Model Normalized to 1NF asset 549, and Data Dictionary detailed after ALM asset 551.

The Adjustments for Security and Privacy Requirements for the Data Model asset 543 is a recommendation for adjustments needed to the evolving design that will address needs for data security and for data privacy in the data warehouse.

The In-Scope Data Model Normalized to 3NF asset 545 is an entity relationship diagram, or data model, at a detailed level showing any entities and attributes that fall within the enterprise scope. It is engineered completely into Third Normal Form (3NF), but represents only the business data within scope, data needed to join relationships between business data, and data already in the data warehouse from any previous iteration of the engagement.

The LDM Validated with the Business Questions asset 547 is a data model derivative at a detailed level showing attributes that match with the appropriate business questions.

The In-Scope Data Model Normalized to 1NF asset 549 is an entity relationship diagram at a detailed level and shows any entities and attributes that fall within the enterprise scope. It is engineered completely into First Normal Form (1NF). Many-to-many relationships and repeating attributes have been resolved so that the data model can be implemented in a standard relational database management system.

The Data Dictionary detailed after ALM attribute asset 551 is a refined dictionary data including definitions for all elements captured in the ALM data modeling process.

The logical data model is the foundation on which the data warehouse will be built. Not only is it modeled on what the physical structure of the warehouse will be based, but it also has a major impact on source data systems analysis, definition and design of data extraction and load processes, and the processes whereby business end users will use the warehouse to make high return on investment (ROI) queries against the warehouse. Because of this, an error or omission at the logical model level will have a major, perhaps crippling, impact on the effectiveness and efficiency of the implemented warehouse. The ALM Formal Technical Review task 561 directs the formal technical review necessary to ensure that all data requirements have been addressed, that any gaps between the data required and data that are represented by the logical data model are identified with plans to eliminate them, and that there are no data in the logical data model that are not needed to meet a defined need or infrastructure requirement.

Input assets to the ALM Formal Technical Review task 561 include Formal Technical Review Guidelines asset 563, ALM Formal Technical Review Criteria asset 565, Formal Technical Review High-Level Design asset 567, and many of the assets generated by the Map Source LDM to Requirements task 501, Conduct LDM Workshop task 521, and Validate LDM task 541.

Formal Technical Review Guidelines asset 563 describes the process to be followed to execute a formal technical review (FTR). The ALM Formal Technical Review Criteria asset 565 consists of the criteria that will be used in the formal technical review (FTR) for the Analyze: Logical Model service. The Formal Technical Review High-Level Design asset 567 describes the purpose, participants, possible outcomes, actions to be taken, and input and output assets for the formal technical review (FTR).

The work product of the ALM Formal Technical Review task 561 is ALM Formal Technical Review Results asset 569 that contains the results from the formal technical review (FTR) of the Analyze: Logical Model service.

TSM Browser

The TSM Browser is used by project staff to refer to methodology technique, templates, examples, and guides from compact disk (CD) or Web sources, manage work in process, and submit the completed work product to project management. The TSM Browser is used by project management to interface to Microsoft (MS) Project, create sections of the Statement of Work (SOW), generate the engagement web site, receive completed work product, and at project closeout, send the project assets to the Archive.

Figure 6:
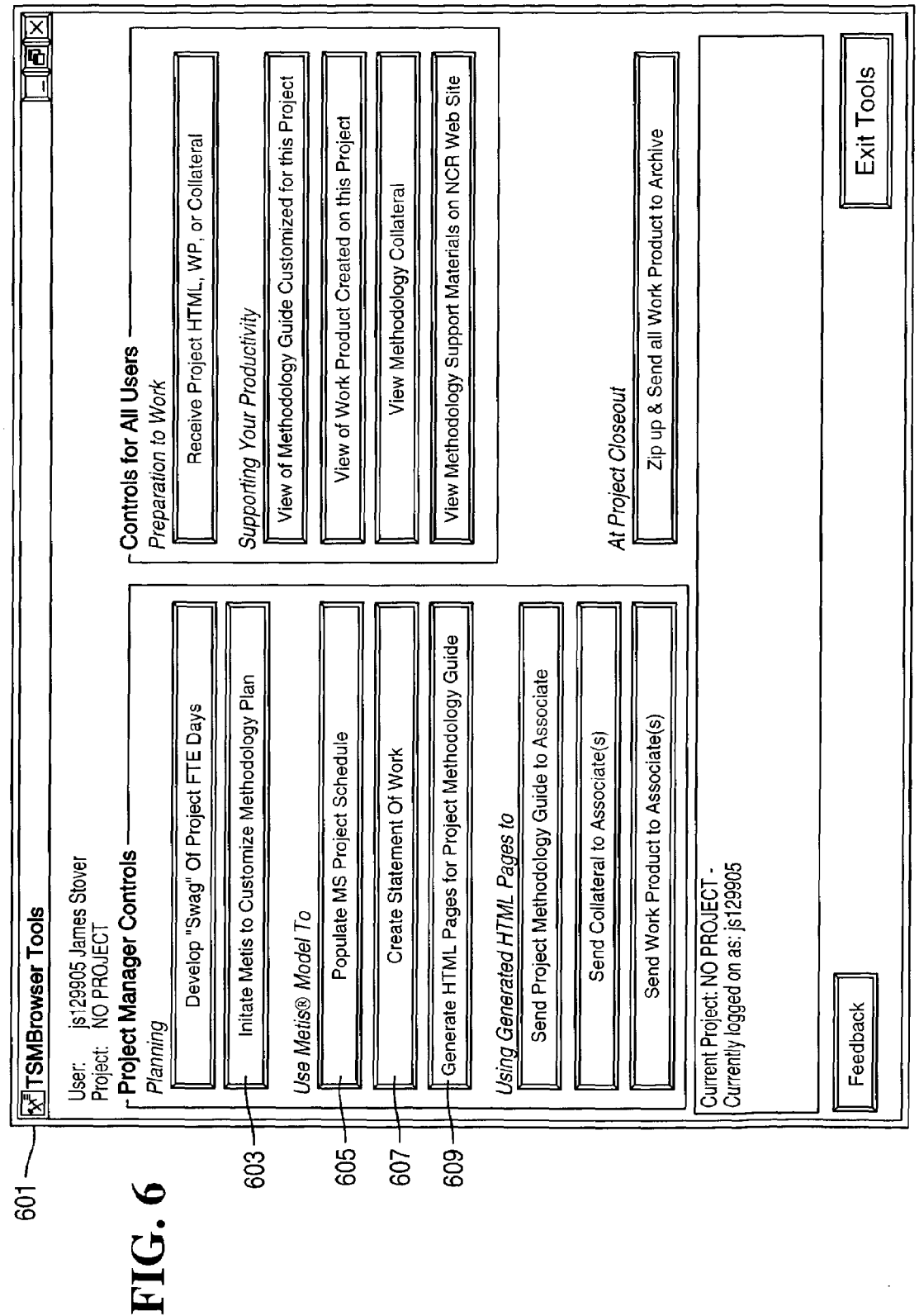
FIG. 6 provides a screen illustration of the TSM Browser Tools interface utilized to access the TSM Visual Model and TSM Tools.

The TSM Browser Tools interface 601, shown in FIG. 6, provides functionality that allows project managers and associates to easily navigate to access the right tools to perform their tasks in the TSM project workflow. In general, the buttons on the left side of the Tools menu are used by a project manager to control their tasks in the workflow process. The buttons on the right side of the interface are for other users to manage their tasks in the workflow process.

The TSM workflow process allows the project team to successfully manage the work involved from project initiation to completion. Throughout the process there are a variety of tools used and deliverables created, e.g., Statement of Work, to successfully manage the project, work on the project, and communicate amongst the team and with the data warehouse customer.

The methodology model, visually represented via the METIS Visual Modeling Tool as described above, is accessed through selection of button 603 from the TSM Browser Tools interface 601. Once selected the methodology may be customized for a particular data warehouse engagement, turning off unneeded assets and incorporating Solution Modifiers, if necessary, based on unique customer requirements. This process has been fully described above.

The TSM Browser is further utilized by project management to estimate the project duration and to produce three deliverables/outputs: a custom methodology plan; a statement of work (SOW); and a project methodology guide. The tools to produce these three deliverables are accessed through selection of buttons 605, 607 and 609, respectively, from the TSM Browser Tools interface 601.

Figure 7:
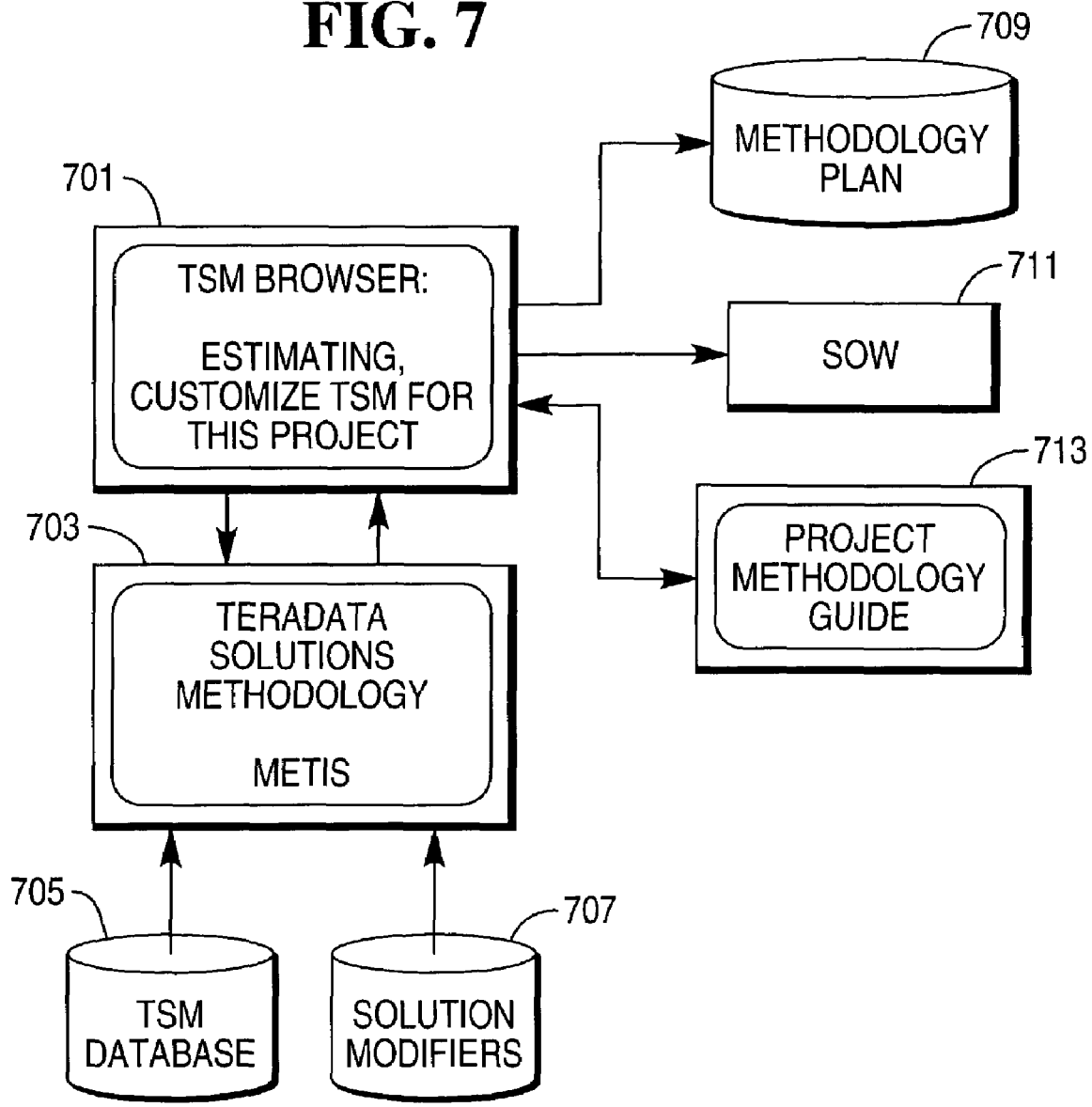
FIG. 7 is a simple block diagram illustration showing the relationship between the TSM Database, TSM Visual Model and TSM Browser, and TSM deliverables.

The relationship between the TSM Browser, TSM METIS Visual Model, TSM Database, methodology plan, statement of work (SOW), and project methodology guide is illustrated in FIG. 7. The TSM Browser 701 provides access to the TSM METIS model 703, supported by the TSM Database 705 and Solution Modifier files 707, for visualization and customization of the methodology. Additionally, the TSM Browser 701 extracts information from the TSM METIS model 703, TSM Database 705 and Solution Modifier files 707 to generate the custom methodology plan 709; statement of work (SOW) 711; and project methodology guide 713.

Figure 8:
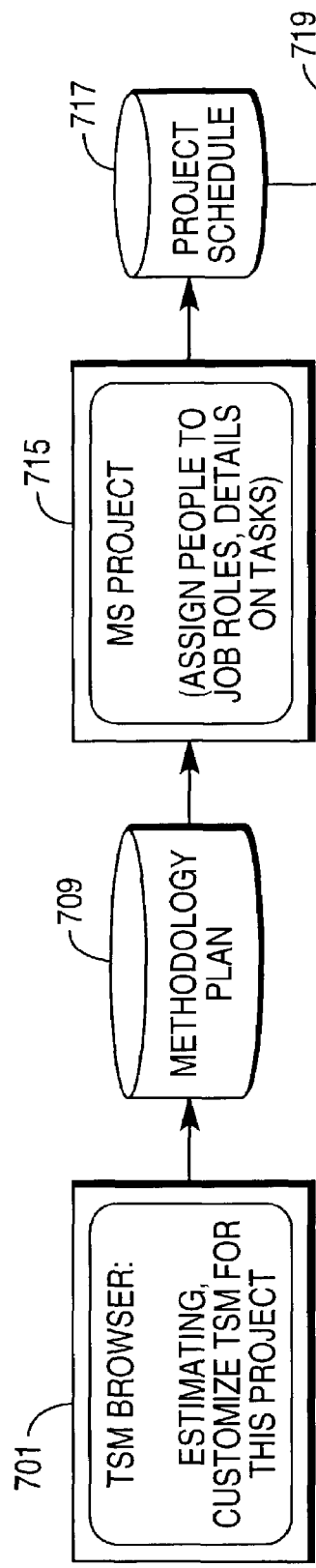
FIG. 8 illustrates a process for generating a data warehouse project plan from a customized TSM methodology plan.

The custom methodology plan 709 is created using the METIS tool and will contain all the phases, services and tasks to be done based on the client requirements for the project. The methodology plan 709 may be exported to project management software, such as Microsoft Project (MSP) 715, for conversion into a project schedule 717, as illustrated in FIG. 8. The MSP project schedule 717 includes tasks, resources assigned to tasks, duration of tasks, and the overall project schedule. The MSP project schedule may thereafter be imported into Professional Service Automation software (PSA) 719, such as PSA software available from Changepoint Corporation. Associates use the PSA tools to enter their time against the specified tasks they perform.

Figure 9:
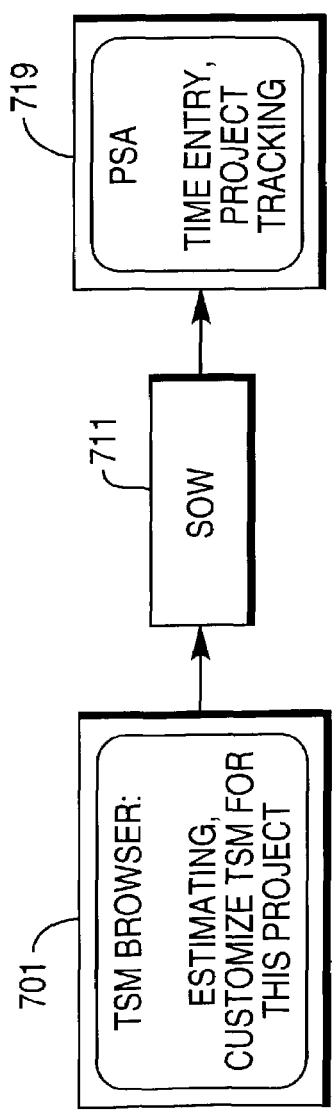
FIG. 9 illustrates a process for generating a data warehouse project Statement of Work (SOW) from a customized TSM methodology plan.

Generation of a Statement of Work (SOW) 711 based on the customized methodology plan is illustrated in FIG. 9. The SOW provides information on what scope of the engagement, deliverables to be produced and responsibilities of the project team, the client and other parties who may be involved in the project. The SOW is stored in PSA software 719 as part of the project plan for project tracking purposes.

Figure 10:
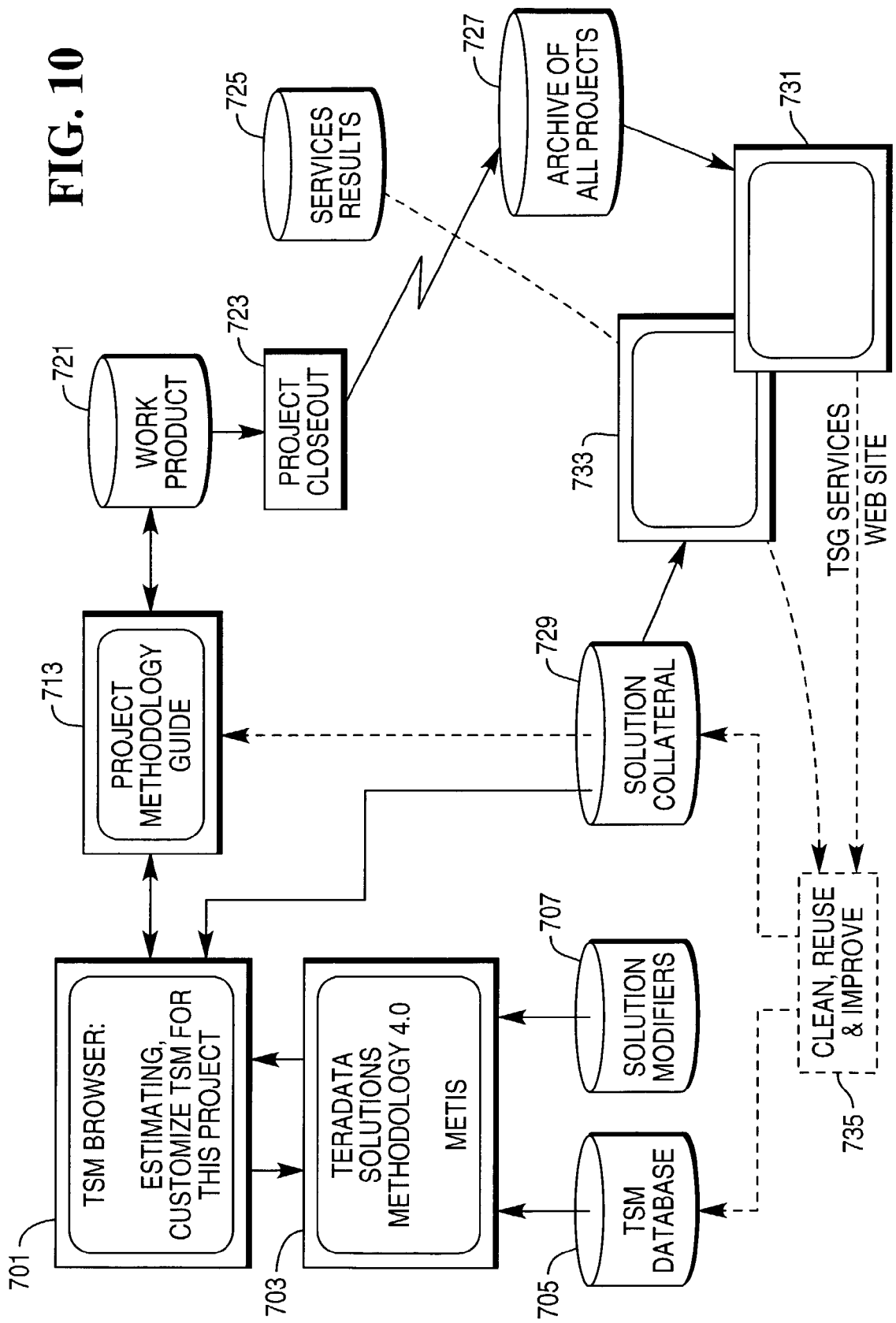
FIG. 10 illustrates a process for generating a data warehouse project methodology guide from a customized TSM methodology plan, and archiving project work product upon conclusion of a data warehouse project.

Generation of a Project Methodology Guide 713 is illustrated in FIG. 10. The project methodology guide is a set of HTML pages that are accessed via the visual representation of the customized methodology plan. This project-specific representation contains additional navigation tools and functionality for managing work products. It is used by the project team to find the project starting point, what tasks to do, how to do the tasks, when to do them, which collateral to use, and which work products will be created.

The project methodology guide includes phase, service, task, asset and job descriptions and asset numbers. The guide is HTML-based, so it can be accessed by all project team members who use the guide to read a description of each task assigned to him/her, determine the inputs required to begin a task, determine the outputs/work products that complete the task, access collateral (templates, examples, and guides), and manage the development and completion of their work products At the conclusion of a project, i.e., Project Closeout 723, the entire project, including all completed Work Product 721, is archived 727 and sent to the TSG Services Web site 731 where it is stored based on pre-defined security levels. To continuously improve the Teradata Solutions Methodology, each archived project is reviewed for any new or different collateral or work product to add to the methodology for reuse on future projects.

CONCLUSION

The Figures and description of the invention provided above reveal a new and useful data warehouse methodology for planning, developing and implementing data warehouse solutions, and tools for customizing the methodology in accordance with specific customer data warehouse requirements.

The methodology and included phases and services are represented in a user-friendly, customizable visual model that graphically depicts all relationships between the various elements within the methodology. The visual model can be easily navigated to find all necessary tasks and assets to complete required services for a data warehouse engagement.

The data extraction and visualization tools associated with TSM provide unique capabilities to data warehouse project planners and managers to evaluate the impact on the project of changes in project task time allocations and asset provisioning, and to manage resource and time expenditures on the project. The TSM Tools provide the capability to extraction data from the TSM database and provide the extracted data to industry standard and commercially available project planning, project tracking and management and model visualization tools.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A system for planning, developing and implementing data warehouse solutions, said system comprising:

a methodology defining a plurality of tasks associated with planning, developing and implementing a data warehouse solution;

a database residing within a computer system containing content associated with said tasks; and a visual model of said methodology for display and customization within a visual modeling program operating within said computer system;

and wherein:

said visual model identifies relationships between said tasks, and including links between said tasks and content contained within said database related to said tasks;

said methodology is customized for a particular data warehouse engagement through the selection of tasks displayed in said visual model for inclusion in said particular data warehouse engagement; and said content associated with the tasks included in said customized methodology is extracted from said database to produce a statement of work for said particular data warehouse engagement.

2. The system in accordance with claim 1, wherein:

said plurality of tasks are organized into a plurality of services displayed in said visual model, each one of said services having defined inputs and work products.

3. The system in accordance with claim 2, wherein:

said plurality of services are organized into a plurality of phases displayed in said visual model, each one of said phases representing a general phase in the planning, development and implementation of a database system.

4. The system in accordance with claim 3, wherein said phases include at least one of the following:

a strategy phase including services that clarify the scope of a data warehouse engagement;

a research phase including services that identify and rank issues and opportunities based on potential value, difficulty of execution, and information requirement needed to support said data warehouse engagement;

an analyze phase including services for identifying specific application requirements and a logical data model to support said data warehouse engagement;

a design phase including services for transforming requirements into a solution design for said data warehouse engagement;

an equip phase including services for installing and supporting hardware and software needed for the building and operation of a data warehouse;

a build phase including services for transforming said solution design into working applications for said data warehouse engagement;

an integrate phase including services for assembling components into a system, testing said system, and performing initial data loads of current and historical data; and a manage phase including services for system performance management and capacity planning.

5. A system for planning, developing and implementing data warehouse solutions, said system comprising:

a methodology defining a plurality of tasks associated with planning, developing and implementing a data warehouse solution;

a database residing within a computer system containing content associated with said tasks; and a visual model of said methodology for display and customization within a visual modeling program operating within said computer system;

and wherein:

said visual model identifies relationships between said tasks, and including links between said tasks and content contained within said database related to said tasks;

said methodology is customized for a particular data warehouse engagement through the de-selection of tasks displayed in said visual model for exclusion from said particular data warehouse engagement; and said content associated with the tasks included in said customized methodology is extracted from said database to produce a statement of work for said particular data warehouse engagement.

6. The system in accordance with claim 5, wherein:

said plurality of tasks are organized into a plurality of services displayed in said visual model, each one of said services having defined inputs and work products.

7. A tool for aiding project managers in planning, developing and implementing a data warehouse solution; said tool comprising:

a visual model providing a visual representation of a plurality of tasks associated with planning, developing and implementing a data warehouse solution, said visual model capable of being displayed and customized within a visual modeling program operating on a computer system; and a database residing within said computer system containing content associated with said tasks;

and wherein:

said visual model identifies relationships between said tasks, and including links between said tasks and content contained within said database related to said tasks;

said visual model is customized for a particular data warehouse engagement through the selection of tasks displayed in said visual model for inclusion in said particular data warehouse engagement; and said content associated with the tasks included in said customized methodology is extracted from said database to produce a statement of work for said particular data warehouse engagement.

8. A tool for aiding project managers in planning, developing and implementing a data warehouse solution; said tool comprising:

a visual model providing a visual representation of a plurality of tasks associated with planning, developing, and implementing a data warehouse solution, said visual model capable of being displayed and customized within a visual modeling program on a computer system; and a database residing within said computer system containing content associated with said tasks;

and wherein:

said visual model identifies relationships between said tasks and including links between said tasks and content contained within said database related to said tasks:

said visual model is customized for a particular data warehouse engagement through the selection of tasks displayed in said visual model for inclusion in said particular data warehouse engagement; and said content associated with the tasks included in said customized methodology is extracted from said database to produce a project methodology guide for said particular data warehouse engagement.

9. A customizable methodology plan for the planning, development and implementation of a data warehouse solution; said customizable methodology plan comprising:

a plurality of tasks associated with planning, developing and implementing a data warehouse solution, a visual model displaying a sequencing of said tasks and identifying relationships between said tasks and including links between said tasks and content contained within a database related to said tasks, said visual model capable of being displayed and customized within a visual modeling program operating on a computer system; and wherein said visual model is customized for a particular data warehouse engagement through the selection of tasks displayed in said visual model for inclusion in said particular data warehouse engagement: and wherein said content associated with the tasks included in said customizable methodology plan is extracted from said database to produce a statement of work for a particular data warehouse solution.

10. A method for planning, developing and implementing data warehouse solutions, said method comprising the steps of:

defining a methodology including a plurality of tasks associated with planning, developing and implementing a data warehouse solution;

establishing a database within a computer system containing content associated with said tasks;

creating a visual model of said methodology for display and customization within a visual modeling program operating on said computer system, said visual model identifying relationships between said tasks, and including links between said tasks and content contained within said database related to said tasks;

customizing said methodology for a particular data warehouse engagement through the selection of tasks displayed in said visual model for inclusion in said particular data warehouse engagement; and automatically generating a statement of work for said particular data warehouse engagement from content extracted from said database.

11. The method in accordance with claim 10, wherein:

said plurality of tasks are organized into a plurality of services displayed in said visual model, each one of said services having defined inputs and work products; and said methodology is customized for a particular data warehouse engagement through the selection of services displayed in said visual model for inclusion in said particular data warehouse engagement.

12. A method for planning, developing and implementing data warehouse solutions, said method comprising the steps of:

defining a methodology including a plurality of tasks associated with planning, developing and implementing a data warehouse solution;

establishing a database within a computer system containing content associated with said tasks;

creating a visual model of said methodology for display and customization within a visual modeling program operating on said computer system said visual model identifying relationships between said tasks, and including links between said tasks and content contained within said database related to said tasks:

customizing said methodology for a particular data warehouse engagement through the selection of tasks displayed in said visual model for inclusion in said particular data warehouse engagement, and automatically generating a project methodology guide for said particular data warehouse engagement from content extracted from said database.

* * * * *